United States Patent [19]

Freeze

[11] Patent Number: 4,987,502
[45] Date of Patent: Jan. 22, 1991

[54] ANTI-WEAR DISK DRIVE SYSTEM
[75] Inventor: Robin J. Freeze, Milpitas, Calif.
[73] Assignee: Eastman Kodak Company, Rochester, N.Y.
[21] Appl. No.: 915,368
[22] Filed: Oct. 6, 1986
[51] Int. Cl.$^5$ .............................................. G11B 21/02
[52] U.S. Cl. ........................................ 360/75; 360/69
[58] Field of Search .................................. 360/69, 75
[56] References Cited
U.S. PATENT DOCUMENTS

| 4,445,188 | 4/1984 | Barrett | 360/75 |
| 4,458,273 | 7/1984 | Johnson | 360/74.1 |
| 4,635,145 | 1/1987 | Horie et al. | 360/75 |

FOREIGN PATENT DOCUMENTS

| 54-10332 | 6/1979 | Japan | 360/75 |
| 55-43681 | 3/1980 | Japan | 360/75 |
| 55-52560 | 4/1980 | Japan | 360/75 |
| 55-16366 | 8/1980 | Japan | 360/75 |

OTHER PUBLICATIONS

*Patent Abstracts of Japan*, vol. 4, No. 160, Abstract of Unexamined Application-#55-108963, Masaki Murakami, 8/21/80.
*IBM Technical Disclosure Bulletin*, vol. 21, No. 11, Apr. 1979, p. 4648, Multiple Band Loading Zone for Direct-Access Storage Devices, N. K. Ouchi.

*Primary Examiner*—Aristotelis M. Psitos
*Assistant Examiner*—David L. Robertson
*Attorney, Agent, or Firm*—Warren W. Kurz

[57] ABSTRACT

A low-wear floppy disk drive system includes an anti-wear controller which randomly selects successive disk tracks to which it directs the disk read/write head whenever the disk drive is idle, so as to more evenly distribute head contact wear across lesser used portions of the disk, and thus increase disk life. The anti-wear controller does not intercede until after the disk drive has been idle for a minimum idle time (e.g. 15 seconds). After a maximum number (e.g., 6) of such idle period-After a maximum number (e.g., 6) of such idle periods—after the head has been moved a maximum number controller stops the disk rotation, thus stopping head contact wear on the disk altogether. The system excludes the most frequently used disk tracks—i.e., those tracks storing the disk file allocation tables—from the random selection. The system further excludes the innermost tracks on the disk—where the media is less compliant and disk wear more rapid—from the random selection.

9 Claims, 3 Drawing Sheets

ANTI-WEAR DISK DRIVE SYSTEM

BACKGROUND OF THE INVENTION

1. Technical Field

This invention is related to disk drive systems, and particularly to those disk drive systems adapted to receive a removable floppy disk characterized by a magnetic media which is subject to eventual destruction through head contact wear.

2. Description of Related Art

Magnetic disks are the most popular type of memory for home personal computers. The data capacity of a magnetic disk is limited by the number of bytes that may be stored in a given track length. Hard disks, characterized by a stiff media, may be rotated at relatively high rotational rates, and therefore provide the advantages of a fast data rate (short data access time) and an aerodynamic cushion between the disk and the read/write head (which virtually eliminates head contact wear on the disk). However, hard disks suffer from the disadvantage that they are relatively costly and, until recently, were not removable from the disk drive. Some recent development efforts have produced removable hard disks, but these are relatively more expensive.

Floppy disks have, since their inception, been removable from the disk drive; and are relatively inexpensive and therefore much more attractive in the consumer personal/home computer market. However, floppy disks suffer from the disadvantage that—generally—they must be rotated by the disk drive at a relatively slower rotational rate. Therefore, there is little aerodynamic cushion between the disk and the head so that the disk wear due to head contact is relatively great. The magnetic read/write head rides on the magnetic media on the floppy disk surface and eventually, through attrition, abrasion and stress, wears it out, so that the disk becomes useless. The outermost disk tracks receive the most frequent wear because they typically store the disk file allocation tables so that the read/write head must spend a higher percentage of its time in the outermost tracks. The innermost tracks suffer from the disadvantage that the disk media is less compliant, so that the rate of head contact wear (i.e, the wear per unit time during head contact) is more rapid in the innermost disk tracks.

Various solutions of limited efficacy are known in the art. These solutions recognize that a personal computer needs to access data on the disk sporadically, so that there are a number of times during which the disk drive system is essentially idle, possibly for several seconds or minutes at a time. By minimizing or eliminating head contact with the disk during idle times when no such contact is required, overall disk wear may be reduced and the disk life extended.

An obvious solution is to simply stop disk rotation whenever the personal computer leaves the disk drive idle. Unfortunately, this solution introduces a severe limitation in the data access time of the disk drive, since each subsequent request for data is delayed by about 1 second during which the disk drive system must spin-up the disk and re-position the read/write head. Due to the great competition among disk drive manufacturers with regard to disk drive performance specifications, characterized by data access time differences of milliseconds (and less) between competing products, the addition of one second to the minimum data access time would render such a system not commercially viable in this market. Thus, this obvious solution is really no solution at all.

Another seeming solution is to simply lift the heads from the disk during idle time. However, this suffers from the same type of disadvantage because the time required to re-contact and re-position the head on the disk during each subsequent request for data by the personal computer detracts from system performance.

A more viable solution is described in U.S. Pat. No. 4,445,188 in which, during idle time, the disk is not de-spun and the heads are not removed from the disk (so that there are no great increases in data access time). Instead, head contact wear is distributed across all of the tracks of the disk during idle time by progressively moving the head from the outermost disk tracks to the innermost tracks, one track at a time, during every idle time. This solution has the advantage, of course, that there are no large additional data access delays for spinning-up the disk for each data request or bringing the head back into contact with the disk for each data request. However, a three-fold problem remains unsolved.

DISCUSSION REGARDING THE PROBLEM

The prior art solution of simply progressively scanning all of the disk tracks, during idle time, preferentially creates more idle-time disk wear on the tracks immediately adjacent the most frequently-used tracks—i.e., the outermost tracks containing the file allocation tables—so that disk wear is not as uniformly distributed as desired. This is because the progressive idle-time movement of the head toward the innermost tracks will begin more often in the frequently used outer-most tracks. In order to minimize such preferential wear, a time-weighting system is necessary, such as that described in U.S. Pat. No. 4,445,188, in which the time spent in each of the progressively scanned tracks during an idle period increases as the head progresses toward the lesser-used (innermost) disk tracks. The problem with such a weighting scheme is that it is undesirably complex and may not necessarily optimize the distribution of head contact disk wear, depending upon the habits of the particular user or the disk wear pattern produced by a given software program. Furthermore, interrupting the disk drive operation to move the heads each time the disk drive is even briefly idle introduces undesirable additional delays in data access time. This is because some finite time is required to return the head to the frequently used tracks for each subsequent data request transmitted by the computer to the disk drive. Such additional delays are significant whenever a very large number of data requests are separated by a very short idle time between successive requests. Finally, weighting (increasing) the time spent by the head in each track as it progresses inwardly on the disk does not take into account the fact that disk wear in the innermost tracks is more rapid due to the relative non-compliant nature of the disk media at the innermost tracks.

Accordingly, there is a need for a disk anti-wear system which does not reduce system performance due to overly-frequent head repositionings and which does not require weighting the head idle time in each disk track, but which uniformly distributes head contact wear across the disk in an optimum manner.

SUMMARY OF THE INVENTION

Solution to the Problem

Apparatus embodying the present invention includes a disk drive having an anti-wear system which interrupts normal disk drive operation whenever necessary to most evenly distribute disk wear. The anti-wear system does not interrupt the disk drive operation until it senses that the disk drive has been idle for at least a certain—minimum—time (e.g.. 15 seconds). during which no commands have been received from the host computer requiring the read-write head to read or write data on the disk. (Generally, the disk drive and disk are "idle" in the absence of external commands requiring the head to be positioned over a certain disk track.) After the sensing of this minimum idle time, the anti-wear system generates a pseudo-random track number and then positions the head on the corresponding track. This operation is repeated again if the system remains idle for yet another minimum idle time. Significantly, the anti-wear system excludes ("throws out") any randomly generated track numbers corresponding to any of the frequently used tracks storing the disk file allocation tables (e.g., tracks 0–32) or those tracks falling within the innermost region of the disk where the media is less compliant and therefore subject to more rapid wear (e.g., tracks 280 and above). Finally, if the anti-wear system senses that the disk drive has been continuously idle for a certain—maximum—number (e.g., 6) of minimum idle times (so that the head has been successively directed to 5 randomly selected disk tracks), the anti-wear system stops the disk rotation.

Advantages

Excluding the frequently-used (outermost) disk tracks from random selection during idle time automatically shifts the disk wear to the lesser-used tracks.

The randomness of the idle-time track selection provides uniform distribution of idle-time head contact wear across the disk and avoids preferential idle-time head contact wear in those disk tracks adjacent the frequently worn (outermost) tracks. Thus, no weighting of the head idle time in each track is necessary, a significant advantage. Another advantage is that unnecessary increases in data access time are avoided by preventing the anti-wear system from interrupting disk drive operation unless the disk drive idle time exceeds the established minimum time (e.g., 15 seconds) so as to avoid overly-frequent anti-wear interruptions. Finally, the invention compensates for the greater susceptibility of the innermost tracks to rapid head contact wear by excluding those tracks from random selection during idle time.

In summary, the invention addresses and solves several problems in reducing head contact wear on a floppy disk, Problems not even identified—let alone solved—in the prior art. Specifically, the invention evenly distributes head contact wear across a large plurality of disk tracks without requiring any track idle-time weighting device and without preferential idle-time wear in those tracks immediately adjacent the more frequently used (outermost) tracks (a problem unsolved and seemingly intractable in the prior art). The invention achieves all of this without unnecessary increases in data access times.

DESCRIPTION OF THE DRAWINGS

The invention may be understood by reference to the accompanying drawings, of which.

DETAILED DESCRIPTION

Figure 1:
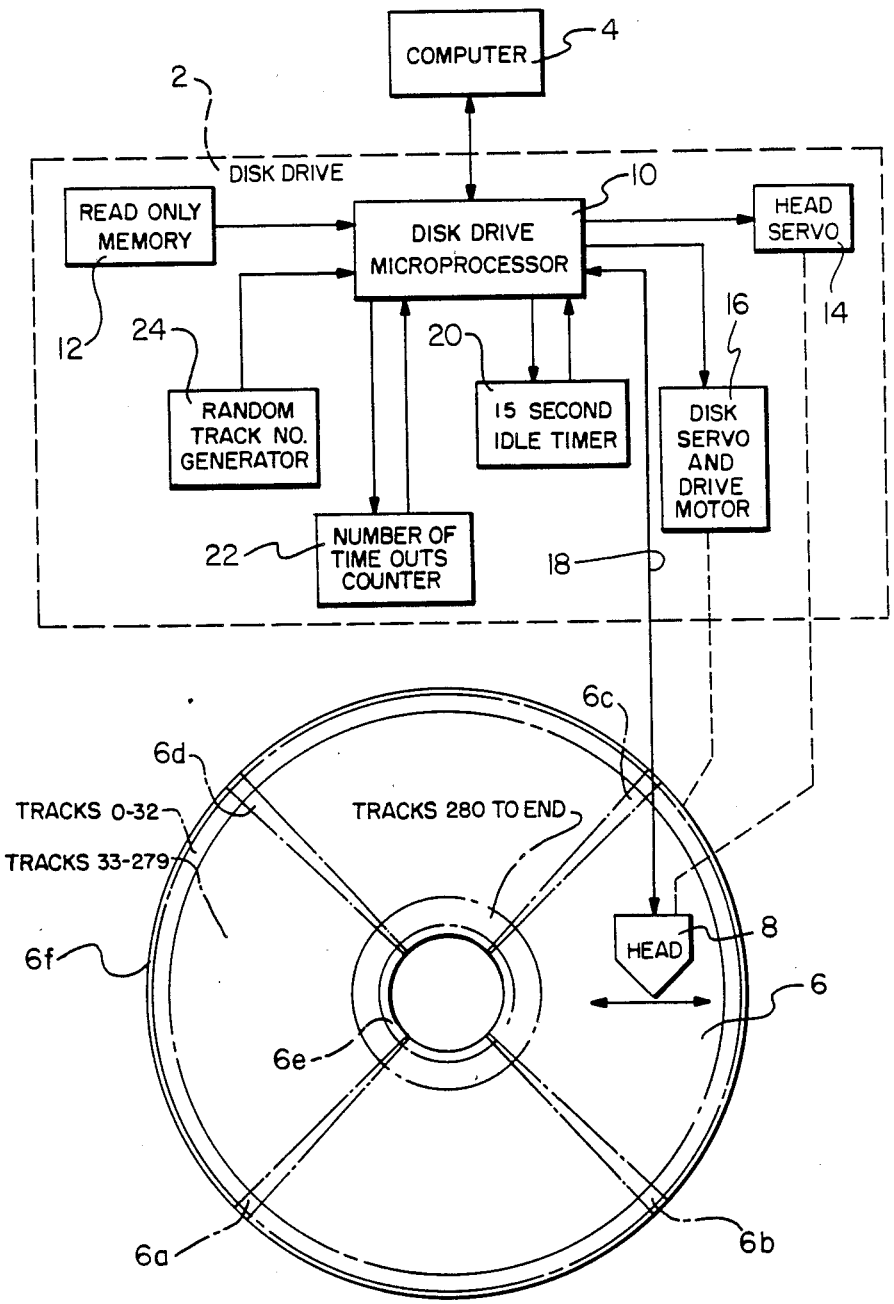
FIG. 1 is a block diagram illustrating a disk drive system embodying the invention.

Referring to FIG. 1, a disk drive 2 receives commands from a computer 4 and controls a disk 6 and a read/write head 8 The disk drive 2 includes a disk drive microProcessor 10 which executes instructions stored in a read-only-memory (ROM) 12. The disk drive microprocessor 10, in response to the commands from the computer 4, controls the positioning of the head 8 over a particular track on the disk 6 through a head servo 14 and controls the rotation of the disk 6 through a disk servo 16.

The disk 6 is divided into a plurality of sectors in the well known manner by sector strips 6a, 6b, 6c, 6d containing synchronizaton and timing data sensed by the head 8. The disk 6 further includes inner and outer guard bands 6e, 6f. Outermost tracks 1 through 32 on the disk 6 store the disk file allocation table and therefore are the most frequently used tracks, i.e. the ones most frequently contacted by the head 8. Accordingly, disk tracks 1 through 32 sustain the most frequent head contact wear. Tracks 280 and above, the innermost tracks on the disk 6, are in a region where the disk media is least compliant, and therefore sustain the most rapid head contact wear (amount of wear per revolution of the disk 6) whenever contacted by the head 8.

The disk drive microprocessor 10 extends the life of the disk 6 by uniformly distributing head contact wear on the disk 6 in the region bounded by track 32 and track 280, whenever the disk drive is "idle", through an anti-wear system which includes a set of instructions stored in the ROM 12, an idle timer 20, a time-out counter 22 and a random number generator 24.

Figure 2:
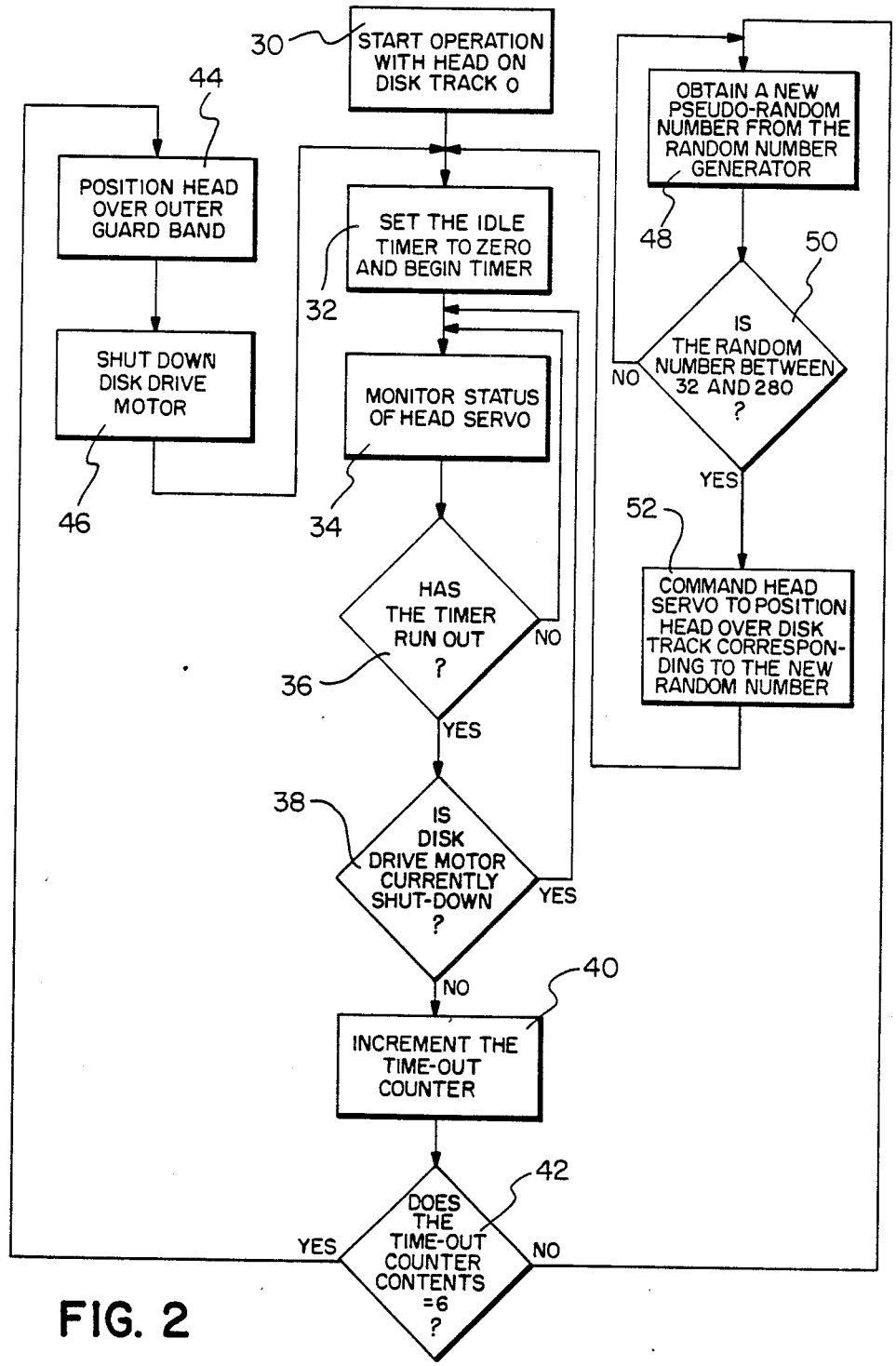
FIG. 2 is a diagram illustrating the operation of a disk drive microProcessor included in the disk drive of FIG. 1.

FIG. 2 illustrates the operation of the anti-wear system when the disk drive 2 is first turned on, and particularly when the computer 4 allows the disk drive to remain idle for a significant period thereafter specifically, operation begins with the head 8 located in disk track 0 (block 30 of FIG. 2). The idle timer 20 (illustrated in FIG. 1) is set to zero and begins running (block 32 of FIG. 2). The idle timer 20 stops running whenever any command is received by the disk drive microprocessor 10 from the computer 4 requiring some activity by head servo 14. The disk drive microprocessor 10 monitors the status of the head servo 14 to detect any activity by the head servo 14 in response to commands received from the computer 4 (block 34 of FIG. 2). As long as no activating commands are received by the disk drive 2 from the computer 4, the idle timer 20 is allowed to continue running until it runs out at the end of an established minimum idle time, for example, 15 seconds. The microprocessor 10 constantly inquires whether the timer 20 has run out of time (block 36 of FIG. 2). As long as the timer 20 has not run out, the microprocessor 10 continues to monitor the status of the head servo ("No" branch of block 36).

Whenever the timer 20 runs out of time, the microprocessor 10 (taking the "Yes" branch of block 36) inquires whether disk rotation is presently stopped (presumably due to an earlier determination by the microprocessor 10 that the computer 4 had allowed the disk drive 2 to remain idle for a very long period of time). If the disk is not rotating, no changes are made and the microprocessor 10 continues to monitor the status of the head servo 14 ("Yes" branch of block 38). Otherwise (following the "No" branch of block 38), the microprocessor 10 increments the time-out counter 22 (block 40 of FIG. 2).

The time-out counter 22 (shown in FIG. 1) always keeps track of the number of consecutive times that the idle timer 20 has run out of time. The microprocessor 10 inquires whether that number equals, for example, 6 (block 42 of FIG. 2). The number 6, in this example, represents the maximum number of consecutive times that the idle timer 20 may run out before the disk drive microprocessor 10 shuts down disk rotation through the disk servo 16. Thus, if the counter 22 equals 6, (taking the "Yes" branch of block 42) the microprocessor 10 commands the head servo 14 to position the head 8 over the disk outer guard band (block 40) and then commands the disk servo 16 to shut down the rotation of the disk 6 (block 46). If, on the other hand, the counter 22 does not presently equal the maximum count e.g., 6), (taking the "No" branch of block 42) the microprocessor 10 activates the random number generator 24 and obtains a random number therefrom (block 48 of FIG. 2). The disk drive microprocessor 10 may repeatedly obtain and reject random numbers from the random number generator 24 until it finds a random number between 32 and 280 (block 50 of FIG. 2 and the "No" branch of block 50). Once a random number is received falling within this range, the microprocessor 10 commands the head servo 14 to position the head over the disk track corresponding to the random number ("Yes" branch of block 50 and block 52 of FIG. 2).

The microprocessor 10 resets the idle timer 20 to zero (each time the head 8 is moved to a randomly selected track and resumes monitoring the status of the head servo 14. It should be recognized by those skilled in the art that any suitable idle time other than 15 seconds may be selected for the idle timer 20 and any suitable maximum count may be selected for the time-out counter 22 within the scope of the invention.

Restricting the randomly selected track number to the range from 32 to 280 has two effects. First, the head 8 is excluded from the frequently-worn file allocation table disk tracks (0 through 32) during any idle period greater than the minimum idle time (e.g., 15 seconds). Secondly, the head 8 is excluded from the innermost disk tracks 280 and above (which are the most susceptible to rapid head contact wear) during any such idle period. The use of a random number generator 24 to select the track assures a uniform pattern of head wear in the disk tracks 33 through 279 and prevents preferential head wear in those tracks (e.g., tracks 33, 34, 35, etc.) adjacent the frequently-used outermost tracks (tracks 0-32).

Figure 3:
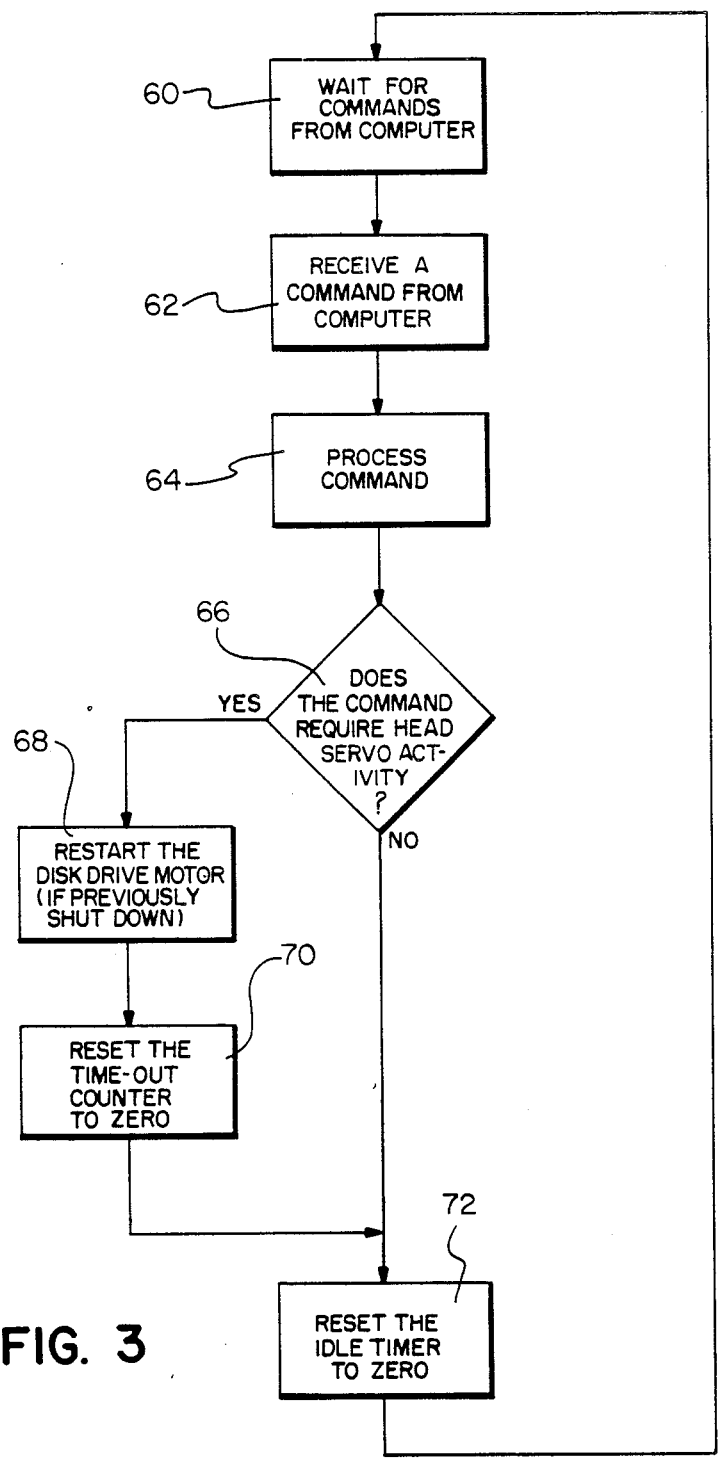
FIG. 3 is a diagram further illustrating the operation of the disk drive microprocessor of FIG. 1.

While FIG. 2 illustrates the operation of the microprocessor 10 when no activating commands are received from the computer 4, FIG. 3 illustrates its operation whenever an activating command is received from the computer 4. Referring to FIG. 3, the microprocessor 10 waits for commands from the computer 4 (block 60 of FIG. 3) and then receives a command (block 62).

The microprocessor 10 processes the received command and prepares to obey it through operations associated with block 64. The microprocessor 10 then determines whether the command requires activity by the head servo 14 (block 66). If the command requires the head servo 14 to position the head 8 over a particular track on the disk 6, then (taking the "Yes" branch of block 66) the microprocessor 10 commands the disk servo 16 to restart the disk rotation (if the disk servo 16 was previously shut down) (block 68). Thereafter, the microprocessor 10 resets the time-out counter 22 to zero (block 70). Finally, the microprocessor 10 resets the idle timer 20 to zero (block 72) and resume monitoring commands from the computer 60.

Not all commands directed by the computer 4 to the disk drive microprocessor 10 necessarily require activation of the head servo 14. For example, some commands may simPly require that the disk drive microprocessor 10 inform the computer 4 of the current status of the head servo 14 or of the disk servo 16. In such a case, no other action is taken except to reset the idle timer 20 to zero ("No" branch of block 66 of FIG. 3). The time-out counter 22 is not reset in this case because the received command did not require activity by the head servo 14.

While the invention has been described in detail with reference to preferred embodiments thereof, it is understood that variations and modifications may be made within the spirit and scope of the invention.

What is claimed is:

1. A disk drive system adapted to extend the life of a disk through uniform distribution of head contact wear during disk idle times, comprising:
   (A) means including a disk servo adaptable to rotate a disk;
   (B) a read/write head adaptable to overlie said disk;
   (C) a head servo including means for controlling the radial position of said head with respect to said disk;
   (D) means for randomly generating a number corresponding to a range of tracks on said disk excluding the most frequently worn tracks thereof; and
   (E) means for processing commands received from an external source and for reading and writing data from or to said disk through said head while controlling said disk servo and said head servo in response to said commands, said processing means further performing as:
      I. means for directing said head servo to move said head to a track on said disk selected by said random number generating means only in absences—lasting a certain minimum idle time—of commands requiring said head servo to position said head over a given track on said disk, and
      II. means for directing said disk servo to stop rotating said disk whenever the number of consecutive ones of said absences exceed a certain maximum number, wherein said selected track is confined to a range of tracks excluding the most frequently used tracks on said disk, whereby disk wear is uniformly distributed during a disk idle time exceeding said minimum idle time in a portion of said disk not subject to frequent wear, and whereby unnecessary repositioning of said head is avoided by ignoring instances wherein idleness of said head servo does not exceed said minimum idle time.

2. The disk drive of claim 1 wherein said range of tracks excludes those tracks in the innermost portion of said disk subject to the most rapid wear from head contact, whereby disk wear is uniformly distributed during a disk idle time exceeding said minimum idle period in a portion of the disk not subject to the most frequent wear and not subject to the most rapid wear from head contact.

3. A disk drive system, comprising:
(A) means including a disk servo for rotating a data-storing magnetic disk;
(B) a read/write head adaptable to overlie said disk;
(C) a head servo adaptable to control the position of said head;
(D) means for randomly generating a track number corresponding to a range of tracks on said disk excluding the most frequently worn tracks thereof;
(E) a timer;
(F) a counter; and
(G) means for processing commands received from an external source and for reading and writing data from or to said disk through said head while controlling said disk and head servos, said processing means further comprising:
  I. means for activating said timer in the absence of receiver external commands requiring said head servo to position said head over a particular track on said disk,
  II. means, activated wherever said timer exceeds a certain maximum idle time, for:
    (a) incrementing said counter;
    (b) obtaining a number from said random number generator means,
    (c) commanding said head servo to position said head over a track on said disk corresponding to said random number; and
  III. means for commanding said disk servo to stop rotation of said disk whenever said counter exceeds a predetermined maximum count, wherein said randomly selected track number is confined to a range of tracks excluding the most frequently used tracks on said disk, whereby disk wear is uniformly distributed during disk idle times exceeding said minimum idle time in that portion of the disk not subject to frequent wear, and whereby unnecessary repositioning of said head is avoided by ignoring instances wherein the idleness of said head servo does not exceed said minimum idle time.

4. The disk drive of claim 3 wherein said processing means further comprises means for resetting said timer and said counter to zero whenever a command is receiver requiring said head servo to position said head over a particular track on said disk.

5. The disk drive of claim 4 wherein said resetting means only resets said timer to zero whenever an external command directed to said disk drive is received not requiring said head servo to position said head over a particular track on said disk.

6. The disk drive of claim 3, 4 or 5, wherein said range of tracks further excludes those tracks in the innermost portion of said disk subject to the most rapid wear through head contact, whereby disk wear is uniformly distributed during disk idle times exceeding said minimum idle time in that portion of the disk not subject to the most frequent wear and not subject to the most rapid wear.

7. The disk drive of claim 1 or 3 wherein said minimum idle time is on the order of 15 seconds and said maximum number is on the order of 6.

8. A disk drive system comprising a read/write head adapted to scan a disk, and means for randomly positioning said read/write head in a range of tracks on said disk excluding the most frequently worn tracks on said disk whenever said disk drive is idle for a period exceeding a certain minimum idle time, wherein said range of tracks further excludes those disk tracks subject to the most rapid wear from head contact, whereby disk wear is uniformly distributed during disk idle times exceeding said minimum idle time in that portion of the disk not subject to the most frequent wear and not subject to the most rapid wear, while unnecessary repositioning of said head is avoided by ignoring instances wherein the idleness of said disk drive does not exceed said minimum idle time.

9. The disk drive of claim 8 further comprising means for stopping rotation of said disk whenever the number of times the idleness of said disk consecutively exceeds said minimum idle time is greater than a certain maximum number, whereby disk wear is stopped after a certain maximum idle time.

* * * * *